(12) United States Patent  
Barron

(10) Patent No.: US 9,963,053 B2
(45) Date of Patent: May 8, 2018

(54) HIP ALIGNMENT DEVICE

(71) Applicant: Kathleen V. Barron, Kissimmee, FL (US)

(72) Inventor: Kathleen V. Barron, Kissimmee, FL (US)

(*) Notice: Subject to any disclaimer, the term of this patent is extended or adjusted under 35 U.S.C. 154(b) by 79 days.

(21) Appl. No.: 15/159,199

(22) Filed: May 19, 2016

(65) Prior Publication Data
US 2017/0120784 A1 May 4, 2017

Related U.S. Application Data

(60) Provisional application No. 62/250,601, filed on Nov. 4, 2015.

(51) Int. Cl.
A47C 7/02 (2006.01)
A47C 7/22 (2006.01)
A47C 7/52 (2006.01)
B60N 2/62 (2006.01)
B60N 2/44 (2006.01)
B60N 2/70 (2006.01)

(52) U.S. Cl.
CPC .............. B60N 2/449 (2013.01); A47C 7/021 (2013.01); A47C 7/22 (2013.01); A47C 7/52 (2013.01); B60N 2/62 (2013.01); B60N 2/7005 (2013.01); B60N 2/986 (2018.02); B60N 2/99 (2018.02)

(58) Field of Classification Search
CPC ......... A47C 7/021; A47C 7/022; A47C 7/185; A47C 7/22; A47C 7/506; A47C 7/52; A47C 7/383; A47C 20/021; A47C 21/08; B60N 2/449; B60N 2/4492; B60N 2/62
See application file for complete search history.

(56) References Cited

U.S. PATENT DOCUMENTS

| | | | | |
|---|---|---|---|---|
| 1,845,338 A | * | 2/1932 | Querna | A61H 1/00 128/882 |
| 2,522,887 A | * | 9/1950 | Nelson | B60N 2/62 296/75 |
| 2,822,033 A | * | 2/1958 | Dixon | B60N 2/6054 297/230.13 |
| 5,272,780 A | * | 12/1993 | Clute | A47D 13/08 5/632 |
| 5,347,669 A | * | 9/1994 | Neviaser | A47D 13/08 5/630 |
| D389,359 S | * | 1/1998 | Nowak | 5/655 |
| D432,846 S | * | 10/2000 | Parker | D6/333 |
| D485,724 S | * | 1/2004 | Morikawa | D6/601 |
| D523,679 S | * | 6/2006 | Illingworth | D6/601 |

(Continued)

Primary Examiner — Ryan D Kwiecinski
(74) Attorney, Agent, or Firm — Global Intellectual Property Agency, LLC; Jordan Sworen

(57) ABSTRACT

A hip alignment device configured to properly cushion and align a user's hips while seated. The hip alignment device includes a first cushion and a second cushion connected to one another via an elongated strap. Each cushion has a concave inner surface adapted to be positioned against the outer portion of a user's thighs or hips. The inner surface further includes one or more rounded ridges thereon. The inner side of the cushion is configured to be positioned flush against the side of a user's thigh or hip, whereas an outer side of the cushion is configured to be placed against a portion of a vehicle, such as a vehicle door or the center console so as to secure the cushion in position.

9 Claims, 2 Drawing Sheets

(56) References Cited

U.S. PATENT DOCUMENTS

| | | | |
|---|---|---|---|
| 7,255,396 B1 | 8/2007 | Anikin | |
| D576,439 S * | 9/2008 | Yaroshenko | D6/601 |
| 7,603,913 B1 * | 10/2009 | Anikin | A61B 5/6887 |
| | | | 297/463.2 |
| D670,122 S * | 11/2012 | Childress | D6/601 |
| 8,672,401 B2 | 3/2014 | Schreiber | |
| D728,970 S * | 5/2015 | Gilroy | A47C 7/383 |
| | | | D6/601 |
| 9,044,097 B1 | 6/2015 | Ardrey | |
| 9,630,534 B2 * | 4/2017 | Heys | B60N 2/449 |
| 9,757,296 B2 * | 9/2017 | Dennis | A61G 7/0525 |
| 2006/0250007 A1 * | 11/2006 | Anikin | B60N 2/62 |
| | | | 297/284.9 |
| 2008/0061613 A1 * | 3/2008 | Anikin | B60N 2/0276 |
| | | | 297/284.9 |
| 2012/0242115 A1 | 9/2012 | Schreiber | |

\* cited by examiner

HIP ALIGNMENT DEVICE

CROSS REFERENCE TO RELATED APPLICATION

This application claims the benefit of U.S. Provisional Application No. 62/250,601 filed on Nov. 4, 2015. The above identified patent application is herein incorporated by reference in its entirety to provide continuity of disclosure.

BACKGROUND OF THE INVENTION

Field of the Invention

The present invention relates to cushion devices. More specifically, the present invention provides hip alignment cushions for use while driving.

Many people spend a considerable amount of time driving in a vehicle while commuting to or from work or traveling on a vacation or business trip. While driving, a person can become stiff and sore if they are not seated properly and if the car seat does not provide proper cushioning. Specifically, the person's hips may become misaligned if the person leans his or her legs against the door or center console in order to temporarily obtain a more comfortable position. Hip misalignment and resulting imbalances in the person's pelvic floor may cause the user to experience lower back pain, stiffness, and other discomfort that may negatively affect the driver even after exiting the vehicle. Thus, a device is required that helps a user to maintain proper hip alignment and provide comfort to the user while driving.

Devices have been disclosed in the prior art that relate to support devices. These include devices that have been patented and published in patent application publications. These devices generally relate to thigh support devices for use while sitting, such as U.S. Published Patent Application Number 2006/0250007, U.S. Pat. Nos. 7,255,396, and 9,044,097. Other devices relate to cushions or barriers adapted to prevent a user from dropping personal items into the crevices or spaces between car seats and the car doors or center console, such as U.S. Published Patent Application Number 2012/00242115 and U.S. Pat. No. 8,672,401.

These prior art devices have several known drawbacks. The prior art includes thigh support devices that can be positioned against a user's thigh, however, such devices are not adapted to help to properly align the user's hips to prevent the user from developing back pain. Further, the prior art devices are not configured to contour to the user's thighs to provide cushioning and support to the user's thighs.

In light of the devices disclosed in the prior art, it is submitted that the present invention substantially diverges in design elements from the prior art and consequently it is clear that there is a need in the art for an improvement to existing hip alignment devices. In this regard the instant invention substantially fulfills these needs.

SUMMARY OF THE INVENTION

In view of the foregoing disadvantages inherent in the known types of thigh supports and leg cushions now present in the prior art, the present invention provides a new hip alignment device wherein the same can be utilized for providing convenience for the user when sitting in a vehicle for an extended period of time.

The hip alignment device comprises a first cushion and a second cushion that are connected via an elongated strap. Each cushion comprises an inner surface having a concave configuration adapted to be positioned against the outer portion of a user's thigh or hip. The exterior surface of the cushion opposite the interior surface is adapted to be positioned against a vehicle door or center console so as to stably position the cushion between the user's thigh/hip and a portion of the vehicle.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
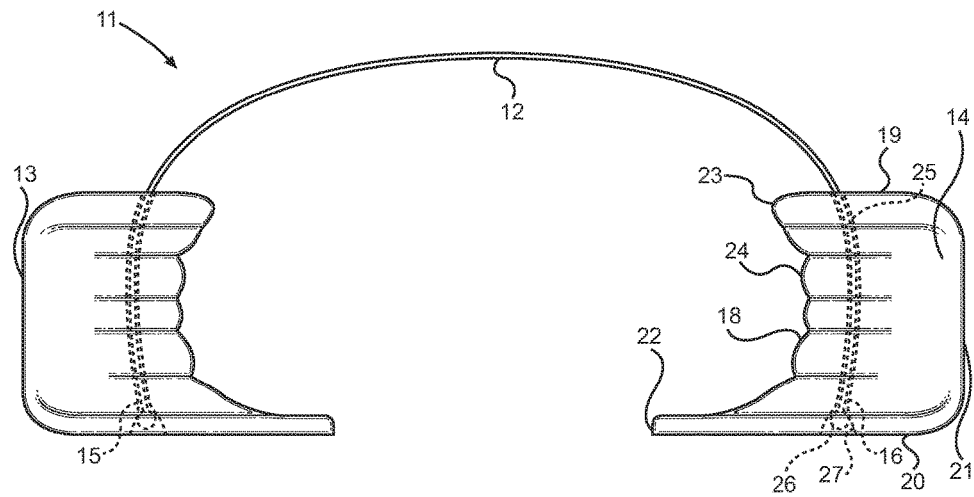
FIG. 1 shows a front view of the hip alignment device.

Reference is made herein to the attached drawings. Like reference numerals are used throughout the drawings to depict like or similar elements of the hip alignment device. For the purposes of presenting a brief and clear description of the present invention, the preferred embodiment will be discussed as used for helping to properly align the user's hips while the user is seated in a vehicle to prevent the user from experiencing stiffness, back pain, or discomfort. The figures are intended for representative purposes only and should not be considered to be limiting in any respect.

Figure 2:
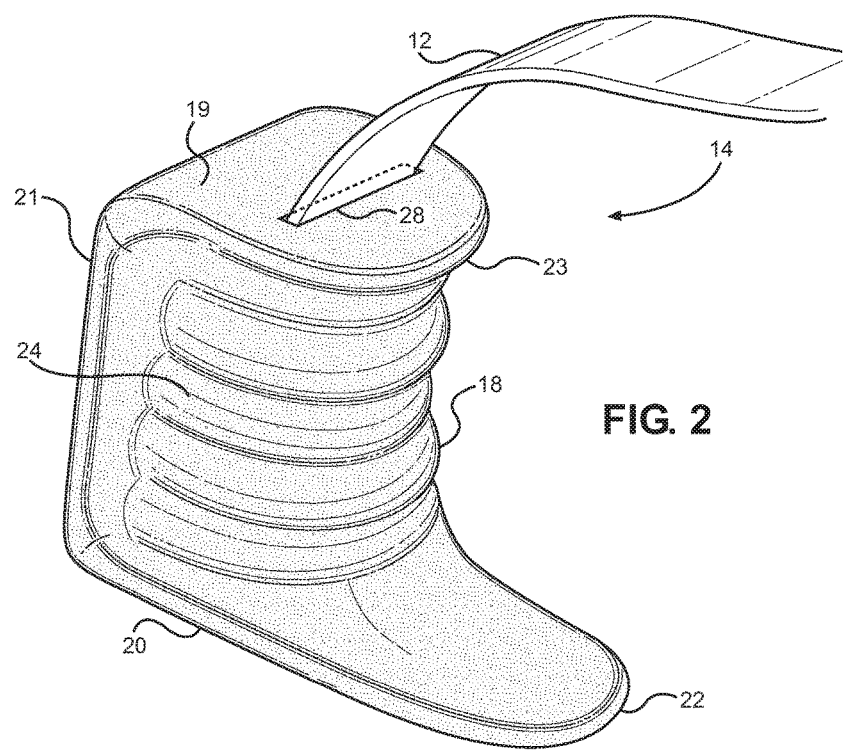
FIG. 2 shows a perspective view of the hip alignment device.

Referring now to FIGS. 1 and 2, there are shown front and perspective views of the hip alignment device. The hip alignment device 11 comprises a first cushion 13 and a second cushion 14, wherein each cushion 13, 14 is adapted to be positioned against the exterior side of a user's thighs or hips while the user is seated, particularly while the user is seated in a vehicle. An inner side 18 of each cushion 13, 14 is concave so as to contour to the curvature of the user's thigh such that the inner side 18 is configured to rest flush against the user's thigh. The inner side 18 further comprises one or more rounded ridges 24 thereon to provide comfort to the user. The ridges 24 are arranged horizontally on the cushion 13. The cushions 13, 14 are composed of a flexible, resilient material, such as a foam, or other similar material.

The cushions 13, 14 preferably have a substantially semi-circular cross sectional area. The upper end 19 of the cushion 13, 14 comprises an inward edge 23 that rests on an upper portion of a user's thigh. The lower end 20 of the cushion 13, 14 comprises an inward edge 22 that extends further outward than the inward edge 23 of the upper end 19. The inward edge 22 of the lower end 20 is adapted to be positioned under the user's thigh so that the weight of the user's body helps to keep the cushion 13, 14 in position.

The outer side 21 of the cushion 13, 14, opposite the inner side 18 is adapted to be positioned against a portion of a vehicle, such as the vehicle door or the center console so as to secure or wedge the cushion 13, 14 in position against the user's thigh or hip so as to provide cushioning and support to the user's thigh or hip. The outer side 21 is preferably substantially flat or rectangular in configuration.

An elongated strap 12 connects the first cushion 13 and the second cushion 14 such that the inner sides 18 of the cushions 13, 14 are facing one another. Preferably, the first end 15 of the elongated strap 12 is affixed to the first cushion 13 while the second end 16 of the elongated strap 12 is connected to the second cushion 14. The elongated strap 12 is preferably composed of an elastic or stretchable material so as to promote an inwardly biased force, drawing the cushions 13, 14 towards one another to provide further support to the user's legs. In alternate embodiments, the elongated strap 12 is composed of fabric such that the strap can be loosely positioned.

In the illustrated embodiment, each cushion 13, 14 comprises a channel 25 that extends from the upper end 19 of the cushion to the lower end 20 thereof. The upper end of the cushion includes an opening 28 that provides access to the channel 25. The lower end of the channel 25 comprises a cavity 27. Each end of the strap extends through the channel 25 and includes a dowel 26 on an end thereof, wherein the dowel is positioned within the cavity 27 and is sized so as to be unable to pass through the channel 25. In this way, the strap 12 is affixed at each end to one of the cushions 13, 14.

In some embodiments, when the cushions are positioned adjacent to the user's hips/thighs, the elongated strap 12 can be disposed across the user's lap while he or she is sitting in the vehicle. In alternate embodiments, the elongated strap 12 is affixed to the lower end 20 of the cushions 13, 14 so that the elongated strap 12 can be placed underneath the user's legs and on top of the car seat while the user is seated in the vehicle.

Figure 3:
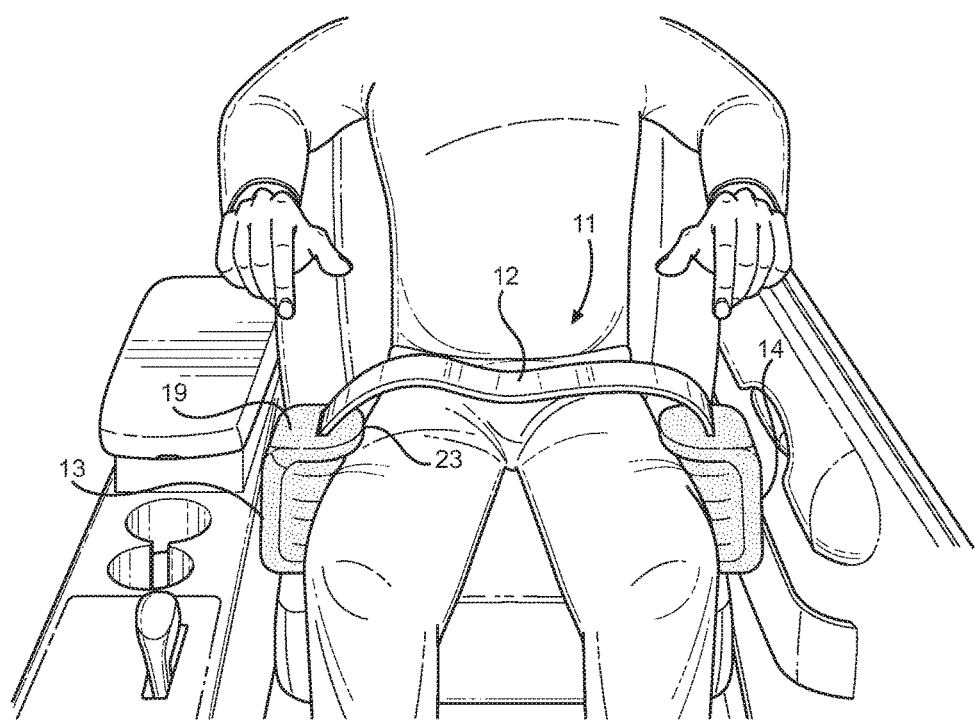
FIG. 3 shows a front view of the hip alignment device in use.

Referring now to FIG. 3, there is shown a front view of the hip alignment device in use. In operation, the user can sit in a car seat in the conventional manner. The user can positioned the first cushion 13 against the outer portion of his or her right thigh and position the exterior side of the first cushion 13 against the center console of the vehicle. The second cushion 14 is then positioned with the inner side thereof against the user's left thigh and the exterior side against the vehicle door. The cushions 13, 14 are wedged between the vehicle and the user's thighs so as to exert pressure against the user's thighs to help cushion and stabilize the user in a seated position. The elongated strap 12 extends across the user's lap and helps to exert additional inward force on the user's thighs. The hip alignment device 11 can be easily positioned for use and removed when the user wishes to exit the vehicle.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hip alignment device for use while sitting, comprising:
   a first cushion connected to a second cushion via an elongated strap;
   wherein the first cushion and the second cushion each comprise an inner side having a concave configuration such that the inner side is adapted to be positioned flush against an exterior portion of a user's hips, and wherein the first and second cushions are adapted to be positioned between a portion of a vehicle and the user's hips so as to securely position the first and the second cushion;
   wherein a cross sectional area along a longitudinal axis of each the first cushion and the second cushion is substantially semi-circular, such that the longitudinal axis extends through an upper end and a lower end of each the first cushion and the second cushion; and
   wherein the inner side of each the first cushion and the second cushion includes a plurality of rounded ridges thereon, such that each rounded ridge of the plurality of rounded ridges is arranged horizontally disposed between an inner edge of the upper end and an inner edge of the lower end.

2. The hip alignment device of claim 1, wherein the elongated strap is composed of an elastic material.

3. The hip alignment device of claim 1, wherein the first cushion and the second cushion are each composed of a foam material.

4. The hip alignment device of claim 1, wherein the inner edge at the lower end of each the first cushion and the second cushion extends further outward from each inner side of the first cushion and the second cushion than does the inner edge of the upper end.

5. The hip alignment device of claim 1, wherein each of the first and second cushions comprises a channel extending from the upper end thereof to the lower end thereof, wherein an end of the strap extends through each channel and is secured therein.

6. The hip alignment device of claim 5, wherein each of the ends of the elongated strap include a dowel thereon, wherein the dowel is sized so as to prevent passage of the dowel through the channel on each cushion.

7. The hip alignment device of claim 1, wherein the inner edges of the lower ends and the inner edges of the upper ends of the first cushion and the second cushion oppose each other.

8. The hip alignment device of claim 1, wherein an upper rounded ridge and a lower rounded ridge of the plurality of ridges extend outwardly from the inner side further than one or more central rounded ridges of the plurality of ridges.

9. The hip alignment device of claim 1, wherein the plurality of rounded ridges are disposed in parallel with the inner edge of the lower end and the inner edge of the upper end of each the first cushion and the second cushion.

* * * * *